Sept. 19, 1944.  H. F. ZOLLER ET AL  2,358,756

COOLING AND ICING BEVERAGES

Filed Dec. 5, 1941  2 Sheets-Sheet 1

Inventors:
Harper F. Zoller
Edward C. Geistert
By Zabel Carlson Greybaugh & Wells, Attys.

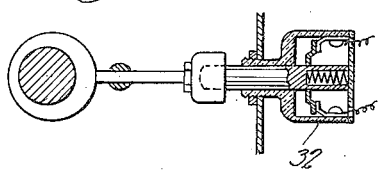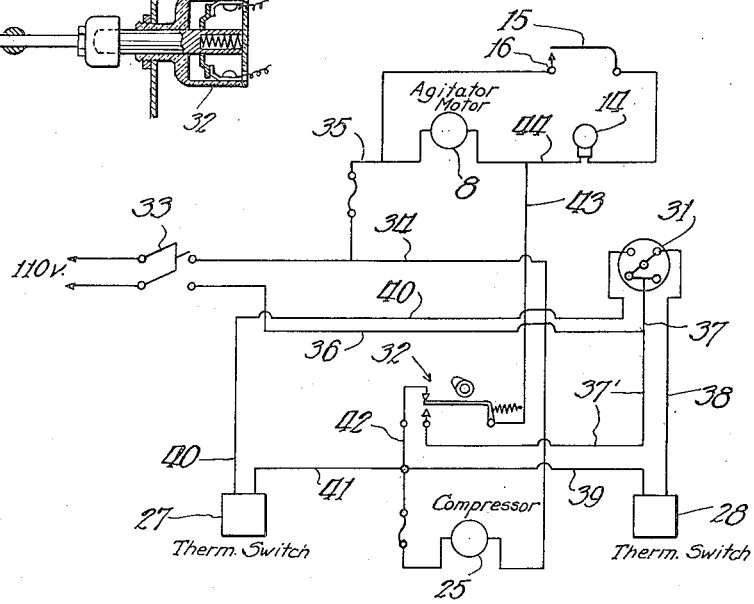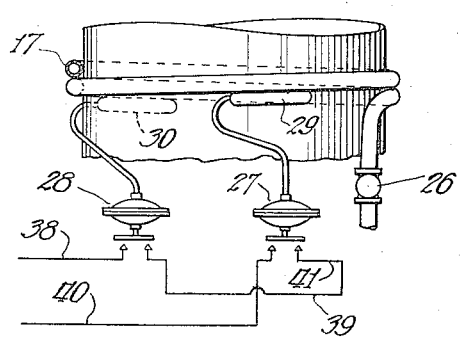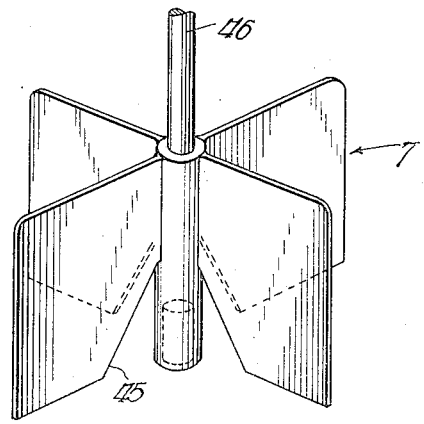

Patented Sept. 19, 1944

2,358,756

UNITED STATES PATENT OFFICE 2,358,756

COOLING AND ICING BEVERAGES

Harper F. Zoller, Detroit, and Edward C. Geistert, Grand Rapids, Mich., assignors to Froid Laboratories, Inc., Grand Rapids, Mich., a corporation of Michigan Application December 5, 1941, Serial No. 421,706

6 Claims. (Cl. 62—114)

The present invention relates to the cooling and icing of various beverages such as are now commonly on sale. It is the customary practice, where iced beverages are desired, to freeze and crack, or otherwise break up the ice and then put the ice in the beverage. Such a method is difficult to carry out without danger of contamination due to the handling of the ice and beverage separately, and furthermore it is expensive and complicated, particularly where the ice is wanted in fine form.

It is the purpose of the present invention to provide a simplification of the cooling and icing of beverages whereby the necessary ice crystals for the beverage are formed directly in the beverage from the water that is a part of it.

The present invention contemplates a method and apparatus whereby the beverage may be placed in a container of sufficient capacity and cooled rapidly to a point where the formation of ice crystals may be initiated and these crystals may be caused to grow and multiply until the desired amount of relatively small crystals is formed directly in the liquid. These crystals form in such fashion as to be an improvement over the usual crushed ice because of greater fluidity and less tendency to pack. Moreover the present invention contemplates an apparatus in which the crystal formation and maintenance is so controlled that at any time the beverage is withdrawn from the container, the ice crystals are rather evenly distributed in the beverage so that one glass of the beverage will not contain any appreciably different amount of the ice crystals than another.

The invention further contemplates an apparatus of this character wherein the controls are such that a greater or smaller amount of crystals may be provided in any given amount of the beverage depending upon the taste of those to be served.

The invention contemplates a further improvement whereby the beverage once chilled to the point of containing the desired amount of ice crystals may be held in this condition and used intermittently from time to time, the drawing off of the beverage being interconnected with the control of the mixture of crystals and liquid so as to assure distribution of the crystals throughout the beverage even after a comparatively long period of standing.

The features and advantages of the invention will appear more fully as the description proceeds, reference being had to the accompanying drawings wherein a preferred form of the invention is shown. It is to be understood, however, that the drawings and description are illustrative only and should not be taken as limiting the invention except insofar as it is limited by the claims.

In the drawings—

Fig. 2 is a fragmentary sectional view illustrating the interconnection between the dispenser control and the mechanism by which distribution of the crystals is maintained in the liquid;

Fig. 3 is a diagrammatic view illustrating the electrical connections and the controls whereby the cooling and icing of the beverage is accomplished;

Fig. 4 is a perspective view of a portion of the mixer; and

Fig. 5 is a somewhat diagrammatic view illustrating the thermostat and thermostatic switch connections.

Figure 1:
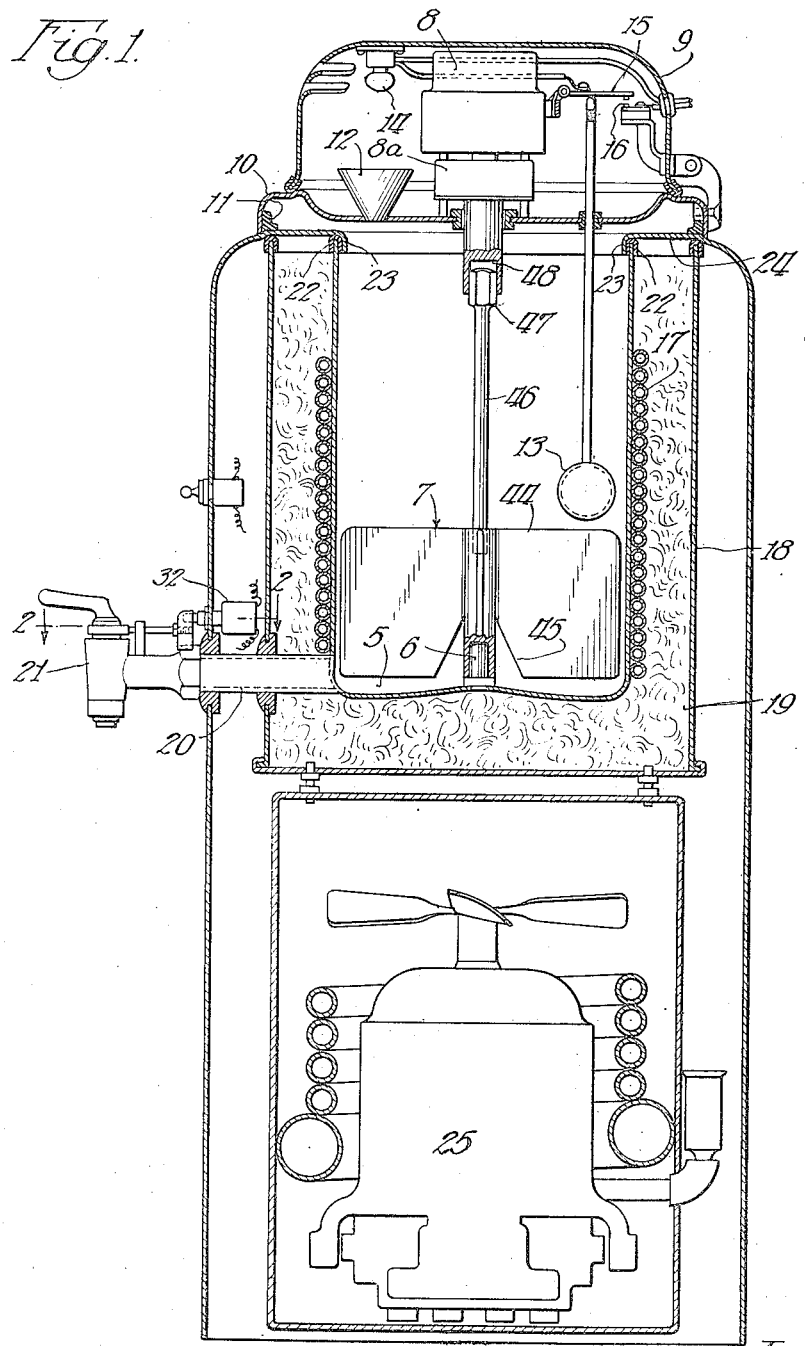
Fig. 1 is a vertical sectional view through an apparatus embodying our invention.

Referring now in detail to the drawings, the present invention is embodied in a device wherein a container 5 of suitable material such as stainless steel is adapted to receive the beverage to be iced. Within this container there is a bearing post 6 upon which a stirrer 7 of a suitable construction is removably placed. The stirrer is shown more clearly in Fig. 4 of the drawings.

It will be noted from Fig. 1 that the stirrer is in spaced relation with respect to the walls of the container 5. This feature is important in the present machine and method. It is common in beverage freezers to provide scrapers to scrape ice off of the heat transfer surface but the present invention avoids ice formation on that surface as will be explained hereinafter.

The stirrer is adapted to be driven by a motor 8 which is located in a removable hood 9 that is hinged to a cover plate 10 over the container 5. The motor 8 is preferably connected through a suitable mechanism 8a so as to oscillate the stirrer. The cover plate 10 is provided with a sealing ring 11 by which it serves to seal the top of the container 5. This cover plate also carries a funnel 12 through which the beverage may be poured into the container 5. Also mounted on the cover plate 10 is a float operated mechanism being adapted to control the opening and closing of a circuit for energizing a warning lamp 14 mounted in the hood 9 by making and breaking contact between a movable contact 15 and a stationary contact 16. The hood 9 is desirably provided with louvers or light slits by which the light in the hood may show on the outside to tell the operator when the level of the beverage within the container 5 reaches the point where it should be refilled. The construction is such that the lower level of the float 13 is above the stirrer and there is no interference of one with the other.

The cooling of the beverage within the container 5 is accomplished by a suitable cooling mechanism around the container. In the form illustrated, this cooling mechanism comprises an evaporation coil 17 wound directly around the container 5 and having its inlet and outlet extending downwardly through an outer shell 18. Within the outer shell and around the container 5 suitable insulation indicated at 19 is provided. This insulation may be rock wool or other material. It will be noted that there is a substantial body of the insulation beneath the container 5 within the outer shell and that the container 5 has a discharge spout 20 extending from the bottom thereof through the insulation and through the outer shell to a faucet 21. The container 5 is provided with a gasket 22 at its upper edge, which gasket fits around a depending flange 23 that forms a part of the top closure 24 of the shell 18. Thus the container, although not welded or otherwise secured to the shell, is actually sealed into the shell except for the open end. The depending flange and the top cover of the shell are desirably made of a non-corrosive material such as stainless steel so as to be easy to keep clean.

Refrigerant is supplied to the evaporation coil 17 from a compressor 25. This compressor is mounted beneath the shell 18 and is connected to the opposite ends of the evaporation coil, there being a condenser on top of the compressor to condense the compressed refrigerant.

Control of the rate of expanding refrigerant in the evaporation coil is by means of an expansion valve 26 and two thermostatic switches 27 and 28 operated by thermostats 29 and 30 that are located in contact with the expansion coil. The switches 27 and 28 are actuated by the thermostats 29 and 30 and are interconnected with the motor 8 and the compressor motor so that, by means of a manually operated control switch 31, the thermostat controlled switch 28 may be put in circuit to control the compressor motor during the initial cooling operation, after which the other thermostat controlled switch 27 can be cut in to maintain the proper operation of the compressor motor during the continued operation of the device. A third switch 32 is interconnected with the faucet so that by turning the faucet toward open position a circuit is completed for the mixer motor without affecting the control of the compressor motor from the thermostats.

The thermostat 29 is more sensitive to changes in temperature than the thermostat 30 so that when the switch 27 is in circuit a smaller change in temperature of the expansion coil is necessary to actuate the switch 27 than would be the case if the switch 28 were in circuit. We therefore call the thermostat 29 the finer acting thermostat because it causes opening and closing of the switch 27 within a narrower temperature range than the temperature range necessary for the thermostat 30 to open and close its switch 28.

The method whereby the beverage is cooled until ice crystals are formed therein is as follows:

Initially when the beverage is placed in the container 5 the switch 31 is thrown into position to put the switch 28 in circuit and to supply current to operate the compressor and the mixer motors. In this case the expansion is permitted to take place at such a rate as to cool the beverage down to a point substantially below that temperature at which the beverage and ice crystals will remain together, in other words, the point of crystallization, without freezing to the sides or bottom of the container. The agitation in the manner shown is such that the warmer liquid continuously is brought out to the receptacle walls and forced upwardly along them to be cooled without forming ice upon the walls. The warm liquid naturally tends to rise and the agitator directly opposes this tendency by drawing the liquid down at the center and forcing it out and up along the walls of the receptacle which act as heat exchange surfaces to extract heat from the moving liquid.

The super-cooling is carried on to a varying degree depending upon the nature of the beverage. For example, we have found that with certain beverages a super-cooling to 1° below the point where the crystals and the liquid will remain together is necessary to initiate the formation of the crystals. With other beverages a super-cooling of as much as 3° is necessary. When the cooling has reached this stage, the agitation of the liquid by the mixer starts the formation of small crystals of ice in the liquid and these crystals continue to grow. The instant the ice crystals begin to form heat is, of course, liberated and the temperature quickly rises (due to the release of heat by the formation of the crystals) to the normal melting point, that is, the point where the crystals and the liquid remain in equilibrium. When this point is reached it is thereafter only necessary to extract from the beverage the amount of heat necessary to form or hold the desired amount of ice crystals within the beverage. For this purpose we use the switch 31 to connect in the finer acting thermostat 29 and this thermostat will energize the compressor or de-energize it and control the mixer motor and expansion valve as the need for more or less extraction of heat arises. By changing the setting of the thermostat controls, it is possible to vary the amount of crystals that will remain ever present in the liquid so that it is possible to have any desired amount of crystals in the beverage withdrawn.

There is, of course, no means of synchonizing the withdrawal of liquid with the automatic operation of the mixer. When the mixer is not operating, the ice crystals will rise to the top of the beverage within the container and liquid withdrawn from the bottom would be substantially free of crystals. Therefore, the discharge faucet is interconnected with the mixer motor so that initially, upon moving the discharge faucet toward open position the mixer motor is energized before any liquid can be withdrawn. This actuates the mixer and the mixer quickly stirs the beverage to distribute the ice crystals uniformly throughout the liquid. By the time the faucet is opened, the mixer will have stirred the beverage in the container sufficiently to distribute the ice crystals in a substantially uniform manner and of course the mixer continues to operate as long as withdrawal of the beverage continues. This does not affect the operation of the thermostatic control as that operation is independent, as can be seen from the diagrammatic showing in Figure 3.

In order that the details of the electrical circuit and the operation thereof will be clear a brief description of the parts will be given with reference being made to Fig. 3. Current is supplied to the unit from a power line through a main switch 33. One lead 34 from the main switch goes direct to the motor of the compressor 25. Another branch 35 of this same lead goes direct to the agitator motor 8. The other lead 36 from the main switch branches into two leads 37 and 37'. The lead 37 goes to the control switch 31. The other lead 37' goes to the faucet operated switch 32.

The control switch 31 is a three way switch operable to connect either the thermostatic switch 27 or the thermostatic switch 28 in circuit. A lead 38 connects a terminal of the switch 31 to the switch 28 and from this switch a lead 39 goes to the compressor motor. Another lead 40 connects a terminal of the switch 31 to the switch 27. A lead 41 connects the other side of the switch 27 to the lead 39 and the compressor motor. The junction of leads 41 and 39 is connected to a terminal of the faucet operated switch 32 by a lead 42.

The motor 8 is connected to the faucet operated switch 32 by a lead 43. A branch 44 of the lead 43 goes to the lamp 14 and to the float controlled switch 15.

First to start the device the operator throws the switch 31 to the position shown to thereby connect the thermostat controlled switch 28 in circuit. Circuit is closed through the leads 36, 37, 38, 39, the motor of compressor 25, and the lead 34. Also, a parallel circuit is closed for the motor 8 and the lamp 14 from lead 39 through the lead 42, the switch 32 and the leads 43 and 35. The compressor and the agitator are started and the expansion valve 26 opens in response to operation of the compressor. As soon as the cooling has progressed far enough to chill the beverage to the crystallization point the control switch 31 is actuated to connect the switch 27 in circuit instead of the switch 28.

The agitator motor is energized whenever the compressor is operating if the switch 32 is in the position shown in Fig. 3. However, if the switch 27 or the switch 28 (whichever is in circuit) is opened, the circuit for the motor 8 is broken while the refrigeration is stopped. When it is desired to withdraw beverage while the compressor is stopped the switch 32 is shifted, by the act of opening the faucet, to connect the lead 37' to the lead 43 and thus supply current to the motor 8 over the circuit established by the leads 36 and 37', the switch 32 and the leads 43 and 35. This circuit also maintains current supply available for the lamp 14.

The stirrer 7 is constructed as shown in Figs. 1 and 4. The blades 44 are cut away as shown at 45. The stem 46 has a polygonal head 47 which is received in a downwardly directed socket 48 on the depending shaft of the gear reduction unit 8a. Thus the socket always drains readily and remains free of any foreign materials.

From the foregoing description it is believed that the nature of our invention and the principal manner of carrying out the same will be clearly understood. Having thus described our invention, what we claim as new and desire to secure by Letters Patent is:

1. In an apparatus of the character described, a beverage receptacle, refrigerating means arranged to extract heat from certain portions of the wall of said receptacle, agitating means within said receptacle operable to maintain the contents thereof in rapid motion, common control means for said cooling means and agitating means maintaining said agitating means in operation while the refrigerating means is in operation, said receptacle having an outlet, a valve controlling said outlet and additional control means for said agitating means connected with said valve for causing operation of the agitating means as the valve is moved to open position regardless of whether the refrigerating means is operating.

2. In an apparatus of the character described, a beverage receptacle, refrigerating means arranged to extract heat from certain portions of the wall of said receptacle, a motor for operating the refrigerating means, agitating means within said receptacle operable to maintain the contents thereof in rapid motion, a motor operating said agitating means, common control means for said motors maintaining said agitating means in operation while the refrigerating means is in operation, said receptacle having an outlet, a valve controlling said outlet and additional control means for said agitating means connected with said valve, for causing operation of the agitating means as the valve is moved to open position regardless of whether the refrigerating means is operating.

3. In an apparatus of the character described, a beverage receptacle, refrigerating means arranged to extract heat from certain portions of the wall of said receptacle, agitating means within said receptacle operable to maintain the contents thereof in rapid motion, common control means for said cooling means and agitating means maintaining said agitating means in operation while the refrigerating means is in operation, said receptacle having an outlet, a valve controlling said outlet and additional control means for said agitating means connected with said valve for causing operation of the agitating means as the valve is moved to open position regardless of whether the refrigerating means is operating, said last named control means effecting operation of the agitating means before the valve reaches open position.

4. The method of icing a beverage which comprises initially extracting heat from the beverage while agitating it until the temperature thereof is brought below the normal crystallization point thereof, thereby to initiate the formation of crystals in the beverage while it is in motion and thereafter extracting heat from the beverage at a rate sufficient to maintain the percentage of crystals in the liquid substantially constant, and agitating the beverage while heat is being extracted therefrom.

5. The method of icing a beverage which comprises initially extracting heat from the beverage while agitating it until the temperature thereof is brought below the normal crystallization point thereof, thereby to initiate the formation of crystals in the beverage while it is in motion and thereafter intermittently agitating and extracting heat from the beverage so as to maintain a predetermined amount of crystals in the beverage, and withdrawing beverage from time to time and agitating the beverage at each withdrawal regardless of whether heat is being extracted from the beverage at that particular time.

6. A method of icing and serving a beverage which comprises initially extracting heat from the beverage until it is below the normal crystallization point thereof, and causing crystals of ice to form in the beverage whereby the heat liberated by forming the crystals will bring the beverage to normal freezing temperature, and thereafter extracting heat, with simultaneous agitation of the mixture, at a rate sufficient to maintain the ice crystal percentage substantially constant in the beverage, and withdrawing the mixture of beverage and crystals from time to time, agitating the mixture in advance of each withdrawal to distribute the crystals in the liquid.

HARPER F. ZOLLER.
EDWARD C. GEISTERT.